United States Patent [19]
Raad

[11] Patent Number: 5,365,133
[45] Date of Patent: Nov. 15, 1994

[54] MINIATURE ROTATING RECTIFIER ASSEMBLY

[75] Inventor: Bernard A. Raad, Burbank, Calif.

[73] Assignee: EEMCO/DATRON, Inc., Los Angeles, Calif.

[21] Appl. No.: 158,281

[22] Filed: Nov. 29, 1993

Related U.S. Application Data

[63] Continuation of Ser. No. 913,228, Jul. 14, 1992, Pat. No. 5,319,272.

[51] Int. Cl.⁵ ............................ H02K 11/00; H02K 9/19
[52] U.S. Cl. .................................. 310/68 D; 310/54; 310/61
[58] Field of Search ................ 310/54, 61, 68 D, 71; 363/145

[56] References Cited

U.S. PATENT DOCUMENTS

| | | | |
|---|---|---|---|
| 2,862,119 | 11/1958 | Else et al. | 310/54 |
| 2,897,383 | 7/1959 | Barrows et al. | 310/68 D |
| 3,267,868 | 8/1966 | Page | 310/54 |
| 4,139,789 | 2/1979 | Hunt | 310/61 |
| 4,581,695 | 4/1986 | Hoppe | 310/68 D |
| 4,603,344 | 7/1986 | Trommer | 310/68 D |
| 4,621,210 | 11/1986 | Krinickas, Jr. | 310/61 |
| 4,628,219 | 12/1986 | Troscinski | 310/68 D |
| 4,647,805 | 3/1987 | Flygare et al. | 310/61 |
| 4,745,315 | 5/1988 | Terry, Jr. et al. | 310/68 D |
| 4,794,510 | 12/1988 | Wege | 310/68 D |
| 4,797,590 | 1/1989 | Raad et al. | 310/68 D |
| 4,806,814 | 2/1989 | Nold | 310/68 D |
| 4,827,165 | 5/1989 | Nold | 310/68 D |
| 4,896,062 | 1/1990 | Pollard | 310/68 D |
| 4,959,572 | 9/1990 | Becker | 310/68 D |
| 4,987,328 | 1/1991 | Shahamat | 310/68 D |
| 5,006,741 | 4/1991 | Schott | 310/68 D |
| 5,012,145 | 4/1991 | Frantz et al. | 310/68 D |
| 5,034,638 | 7/1991 | McCabria | 310/54 |
| 5,034,639 | 7/1991 | Huss et al. | 310/60 A |

FOREIGN PATENT DOCUMENTS 367239  3/1963  Switzerland.
526988  11/1976  U.S.S.R..

Primary Examiner—Steven L. Stephan
Assistant Examiner—Clayton E. La Balle
Attorney, Agent, or Firm—Trexler, Bushnell, Giangiorgi & Blackstone, Ltd.

[57] ABSTRACT

A modular rotating rectifier assembly for use with a brushless self-excited, liquid cooled, dynamo electric device such as a generator. The rotating rectifier assembly is positioned in a rotating hollow shaft of the generator and is coupled with a coolant circulating system for transferring heat from the rectifier assembly to the coolant flowing therethrough. The rotating rectifier assembly is positioned inside the shaft in close proximity to a central axis, longitudinally extending through the shaft, thereby minimizing the centrifugal forces induced on the diode components of the rotating rectifier assembly.

4 Claims, 4 Drawing Sheets

MINIATURE ROTATING RECTIFIER ASSEMBLY

This is a continuation of application(s) Ser. No. 07/913,228 filed on Jul. 14, 1992, now U.S. Pat. No. 5,319,272.

BACKGROUND OF THE INVENTION

The present invention relates to rotating rectifier assemblies for use in dynamo electric devices.

Dynamo electric devices such as self-excited, brushless AC generators typically utilize a rotating rectifier assembly to rectify the output of an exciter rotor and to feed the resulting DC power to a main generator rotor. Rectifier diodes enclosed in a DO-5 or DO-4 case have been traditionally used in such rotating rectifier assemblies with varying degrees of success.

The self-exciting brushless generators typically include three generators placed in tandem along a common rotating shaft. These three generators are retained within a common generator housing. When the machine is cooled by oil conduction, a portion of the interior of the housing is retained in a dry air-filled or gas-filled state surrounding the main field, exciter field and the PMG field. Remaining portions of the housing and generator assembly are cooled by means of a fluid coolant circulation system.

A problem arises with the rectifier assemblies since they are constructed of semi-conductor material and therefore create a weak link in the generator system. The reason for the diodes being a weak link is that they undergo severe mechanical and thermal stresses during the operation of the generator. The parameters of the stresses are very difficult to overcome with known semi-conductor materials. While a variety of configurations and orientations of DO-5 and DO-4 type diodes have been employed, many of the thermal and mechanical problems persist. One type of generator has even used surface mounted devices (SMD) in an attempt to overcome such problems. However, due to the characteristics of the semi-conductor material used in the SMDs, the problems still persist.

With regard to the mechanical and thermal forces acting on the rectifier assembly, such forces are developed due to the nature of the operating conditions of the generator. For example, since the rectifier assembly is generally mounted close to the rotating shaft about which the rotors are positioned, the rectifier assembly, rotating with the rotating shaft, encounters severe centrifugal forces. The thermal conditions also place stresses on the materials of the diode which push the limits of the performance parameters of the semi-conductor material.

FIG. 2 provides a hybrid view of two prior art rectifier assembly configurations. A generator 20 is shown in FIG. 2 which has a rotating shaft 22 with a central axis 24 extending therethrough. A parallel oriented rectifier assembly is shown in the lower portion of the figure. In the parallel oriented rectifier assembly, the diodes 28 are oriented with a minor axis parallel to the central axis 24. The parallel oriented rectifier assemblies experience a substantial degree of centrifugal force due to the distance between the diode and the central axis. In extremely high speed generators, ordinary diodes are unable withstand the high centrifugal forces resulting in such a generator.

One attempt to overcome the problem of the high centrifugal forces, was to mount the diodes perpendicular to the central axis, thereby compressing the diode material and preventing structural fatigue due to high centrifugal forces. While a degree of success was achieved by compressing the diode material, a substantial amount of space was utilized in the perpendicular orientation.

Another problem encountered with the prior art rectifier assemblies as shown in FIG. 2, is that they are positioned in the air or gas enclosed space in which the fields operate, when used in a "conduction" cooled generator. As a result, these rectifier assemblies are exposed to high temperatures and are unable to benefit from the fluid coolant system utilized in other areas of the generator system.

While such assemblies may be acceptable for use in generators which rotate at relatively-low speeds and have sufficient space available for the required mounting of electrical connections, these assemblies become a weak link in a generator which rotates at a relatively high speed. For example, a state-of-the-art generator, which may be used for aircraft, may rotate at speeds exceeding 30,000 rpm to meet the load requirements of the specific application.

More specifically, generators utilized in aircraft or other high technology dependent vehicles require very high power density generators. As a result, one of the most critical factors to achieving a high power density is to provide a high rotational speed. High rotational speed reduces the overall size of the generator. Two particular parameters which limit the rotational speed are the windage, a power loss caused by air friction on rotating bodies and centrifugal loading, a force incurred by a rotating body.

OBJECTS AND SUMMARY OF THE INVENTION

A general object of the present invention is to provide an improved rotating rectifier assembly for use with a dynamo electric device.

Another object of the present invention is to provide a rotating rectifier assembly which minimizes the space used by the rotating rectifier assembly.

Still another object of the present invention is to provide a rotating rectifier assembly which improves the heat transfer away from the assembly.

Yet a further object of the present invention is to provide a rotating rectifier assembly which minimizes the effect of centrifugal forces created by the generator on the diode components of the rectifier assembly.

Still a further object of the present invention is to provide a rotating rectifier assembly which is modular and therefore provides improved ease of installation and repair.

Briefly and in accordance with the foregoing, the present invention comprises a rectifier assembly for use with a brushless self-excited, liquid cooled, dynamo electric device such as a generator. The rotating rectifier assembly is positioned in a rotating hollow shaft of the generator and is coupled with a coolant circulating system for transferring heat from the rectifier assembly to the coolant flowing therethrough. The rotating rectifiers are positioned inside the shaft in close proximity to a central axis, longitudinally extending through the shaft, thereby minimizing the centrifugal forces induced on the diode components of the rotating rectifier assembly.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which.

DETAILED DESCRIPTION OF THE ILLUSTRATED EMBODIMENT

Figure 1:
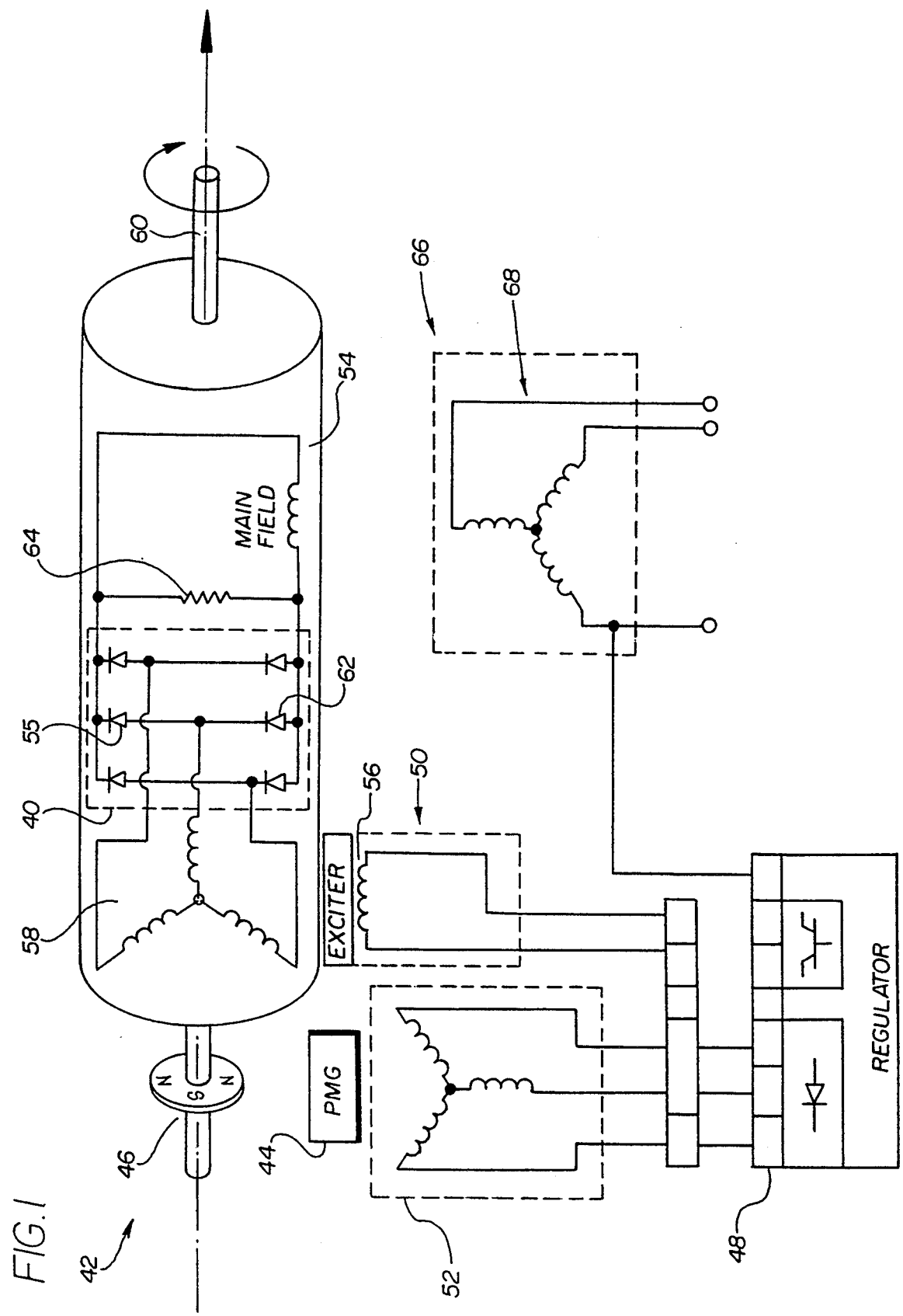
FIG. 1 is a diagrammatic electrical schematic of the dynamo electric device, including a diode assembly used in the rotating rectifier assembly of the present invention.

While the invention may be susceptible to embodiment in different forms, there is shown in the drawings, and herein will be described in detail, an embodiment with the understanding that the present disclosure is to be considered an exemplification of the principles of the invention and is not intended to limit the invention to that as illustrated and described herein.

Referring now to the drawings, wherein like parts are designated by the same reference numerals throughout the figures, a schematic rotating rectifier assembly 40 in accordance with the present invention is shown in FIG. 1. In discussing FIG. 1 reference is also made to FIG. 3. The rotating rectifier assembly 40 is a component of a three-in-one brushless generator shown generally by reference number 42. The generator 42 generates alternating current (AC) but is also capable of generating direct current (DC) when the output from the generator is led through a stationary full-wave rectifier assembly as provided in the rotating rectifiers assembly 40.

Initially, the generator 42 is rotated by a prime mover to begin electrical power generation at the permanent magnet generator (PMG) 44. The field of the PMG 44 is permanently set up by the permanently magnetized rotor 46. The lines of flux emanating from the PMG rotor 46 intersect the conductors in the PMG armature 52 to generate a three-phase AC power.

A voltage regulator 48 in the form of a generally available component of known design is employed to rectify the three-phase AC power generated by the PMG 44 to produce DC and meter it back to an exciter field 50 according to the voltage sensed at the terminals of a main armature 68. A negative feedback loop is thus created to ensure that the generator voltage is maintained within a certain band regardless of the generator speed and loading.

The exciter 50 achieves brushless excitation of a main field 54. The magnetic field 56 of the exciter 50 is stationary and is erected by powering its windings electrically from the PMG 44 via the voltage regulator 48. The three-phase AC exciter armature 58 is attached to a rotating shaft 60 of the generator 42.

Because the main field 54 of the generator requires DC to excite it, a diode assembly 62 is provided in close proximity to the exciter armature 58 to rectify the output of the exciter armature 58 and deliver the output to the main field 54. Although a full wave connection is depicted in FIG. 1, it should also be understood that the arrangement would work to a certain extent with a half wave configuration.

With further reference to FIG. 1, a shunting resistor 64 is connected across the diodes 55 of the diode assembly 62 to protect the diodes from voltage spikes produced when the highly inductive main field 54 is suddenly de-energized. Another function of the shunting resistor 64 is to shorten the inductance/resistance time constant of the field during over voltage transient conditions.

Power used by the loads on the generator is generated by the main generator 66. In a similar fashion to the exciter 50, the magnetic field 54 is erected and intersects the conductors in a main armature 68. The main armature 68 is shown in FIG. 1 as a wye-connected three-phase AC device. It should however be understood that the main armature 68 can also be wound with other combinations of phases, phase groups and can also be rectified with stationary diodes for a DC output.

Figure 2:
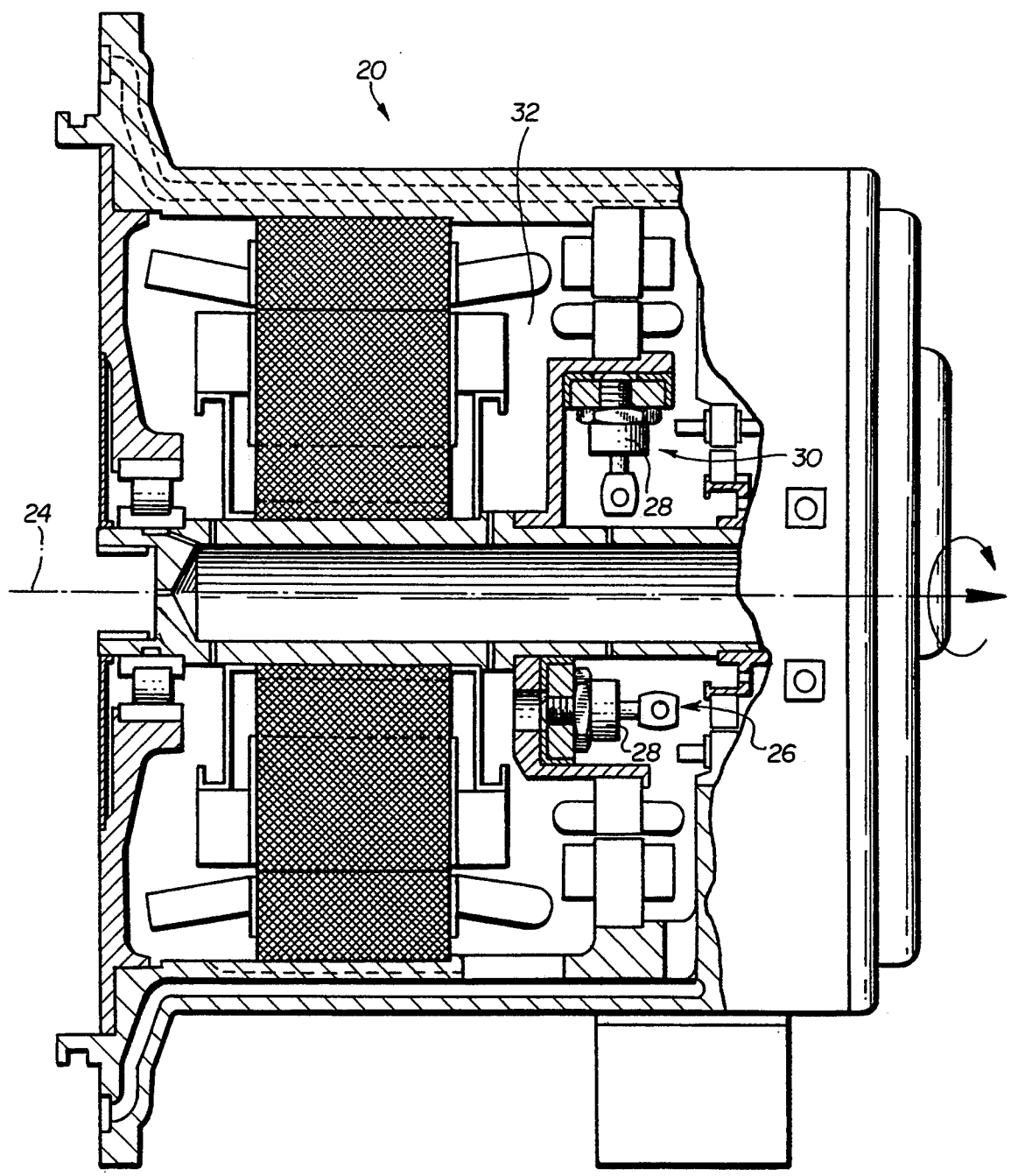
FIG. 2 is a hybrid partial fragmentary cross-sectional side elevational view of a dynamo electric device or generator illustrating two different configurations of prior art rotating rectifier assemblies.

As noted above in the Background of the Invention, FIG. 2 provides a partial fragmentary cross-sectional side elevational view of a prior art generator. It should be noted that the generator as shown in FIG. 2 is a composite showing two diode assembly configurations. The lower portion 26 shown below the center line 24 shows a diode 28 arranged in an orientation parallel to the central axis 24. The diode configuration 30 shown in the portion of the prior art generator 20 above the center line 24 employs diodes 28 in an orientation perpendicular to the central axis 24. In the perpendicular orientation, the material of the diode is placed in a compressive state by the rotational forces exerted upon the diode 28 when the shaft 32 to which the diode is attached is rotated.

Figure 3:
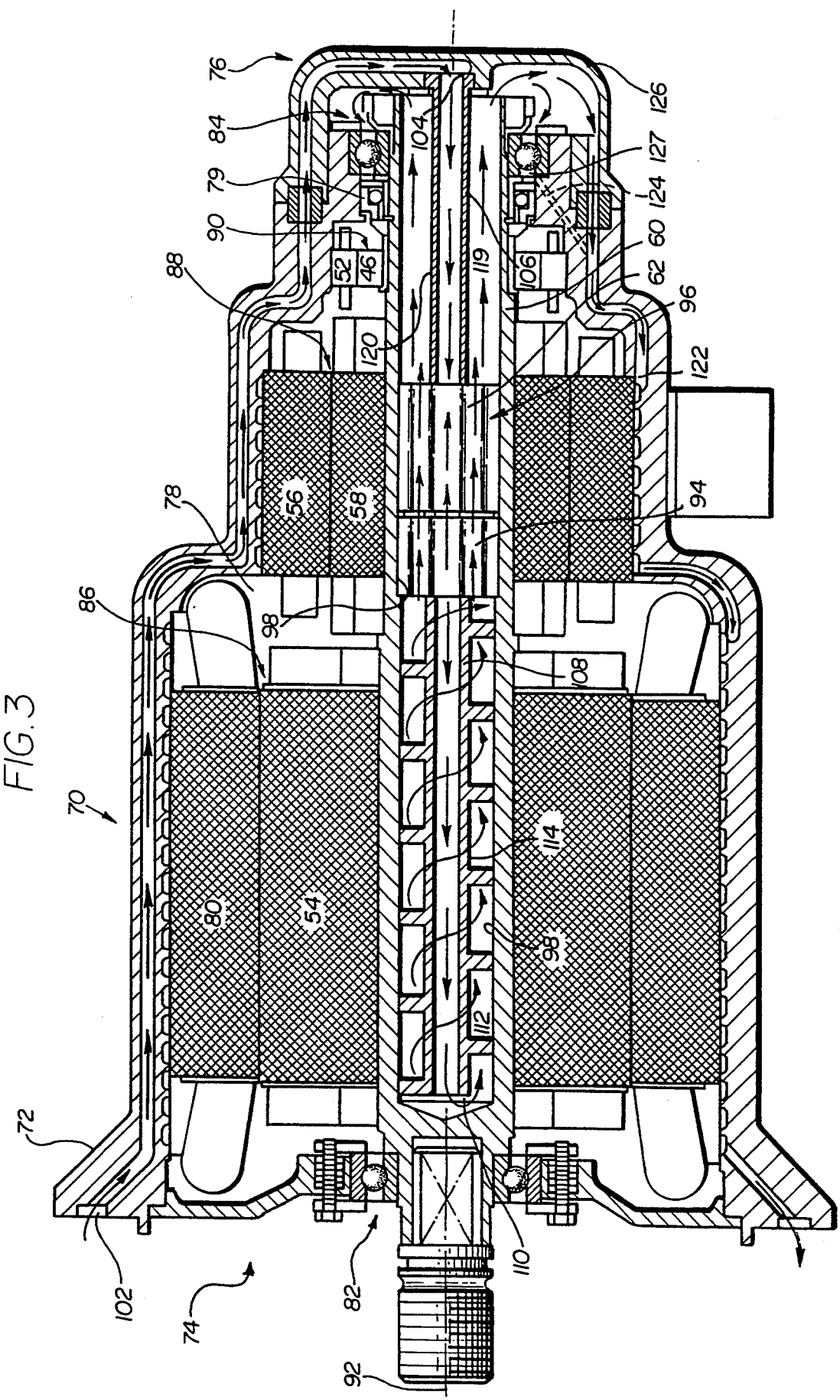
FIG. 3 is a partial fragmentary cross-sectional side elevational view of a dynamo electric device or generator showing a rotating rectifier assembly of the present invention employed therein.

Turning now to FIG. 3, a partial fragmentary cross-sectional side elevational view of a high speed, high power density, self-excited, conduction oil cooled dynamo electric device or generator 70 is shown. The general internal component layout of the generator 70 is similar to the prior art generator 20 as shown in FIG. 2. The layout of the components of the generator 70 are generally more elongated and closer to the rotating shaft 60 than as shown in FIG. 2. By elongating and more closely positioning the components, the windage loss effects are minimized as well as the centrifugal forces. The windage losses increase exponentially with an increase in diameter. In contrast, the windage loss is only increased linearly with an increase in length. As such, the elongated configuration substantially reduces the windage losses.

As shown in FIG. 3, the generator 70 has a generator housing 72 which is sealed at a drive end 74 and at an anti-drive end 76. The sealed housing 72 provides a sealed interior cavity 78 in which a main armature 80, main field 54, exciter field 56, exciter armature 58, PMG armature 52 and PMG field 46 operate. The above-noted components operate in the internal cavity 78 which is maintained in a fluid free or dry state filled only with air or gas. The shaft 60 is supported at the drive end 74 by drive end bearing 82 and is supported at the anti-drive end 76 on anti-drive end bearing 84. Support of the shaft 60 on the bearings 82 and 84 allows the shaft to rotate at a high speed within a sealed condition in the generator housing 72.

A main dynamo unit 86 includes the main armature 80 and the main field 54. An exciter dynamo unit 88 includes the exciter field 56 and the exciter armature 58. A PMG dynamo unit 90 includes the PMG armature 52 and the PMG field 46. The main dynamo 86, exciter dynamo 88, and PMG dynamo 90 are positioned around the rotating shaft for producing the power requirements in a brushless manner for a given load.

The shaft 60 is symmetrically formed about a central axis of rotation 92. The diode assembly 62 mates with a receptacle assembly 94 and comprises the rotating rectifier assembly 96. The receptacle assembly 94 is attached to an inside surface 98 of the shaft 60 by means of fasteners or other means of attachment (attachment not shown) and mateably retains the diode assembly 62 in engagement therewith.

Means for circulating coolant (generally indicated by reference number 100) includes a fluid entry conduit 102 which is formed in the housing 72 and delivers coolant to the generator 70. The fluid entry conduit 102 passes through the outer periphery of the housing 72 from the drive end 74 towards the anti-drive end 76. A primary port 104 in the housing 72 connects the fluid entry conduit 102 with a transfer tube 106 concentrically positioned along the center line 92 inside the rotating shaft 60. As will be described further hereinbelow, the rotating rectifier assembly 96 communicates with the transfer tube 106 such that fluid passing through the transfer tube passes through the rotating rectifier assembly.

A transport tube 108 is concentrically positioned along the central axis 92 inside the shaft 60 in similar manner to the transfer tube 106. The transport tube 108 receives fluid passing through the rotating rectifier assembly 96 and transports it towards the drive end 74 of the shaft 60. At a terminal end 110 of the transport tube 108, the coolant passes into a helical passage 112 in communication with the transport tube 108. The helical passage 112 is formed between an outer surface 114 of the transport tube 108 and an inside surface 98 of the rotating shaft 60.

Coolant is helically transported back toward the rotating rectifier assembly 96 and then flows through gaps 116 (better shown in FIG. 5) formed between flat planar surfaces 118 on the outside of the rotating rectifier assembly and the inside surface 98 of the rotating shaft 60. The coolant passing the outside surfaces 118 of the rotating rectifier assembly 96 flows into a void 119 formed between an outside surface 120 of the transfer tube 106 and the inside surface 98 of the rotating shaft 60. The void 119 communicates with a fluid removal conduit 122 which travels helically around the perimeter of the housing 72 in order to remove heat from the components retained within the housing 72.

It should be noted that the coolant passing from the void 119 to the fluid removal conduit 122 passes over the anti-drive bearing 84 to lubricate the bearing and is subsequently drained through a drain conduit 124 which communicates with a down stream side 126 of the anti-drive bearing 84 and the fluid removal conduit 122. The circulating coolant is prevented from entering dry interior cavity 78 by rotating seal 79. To discuss the rotating rectifier assembly 96 as shown in FIG. 3 in greater detail, reference is made to the enlarged detailed views are shown in FIGS. 4–8. With regard to FIG. 4, the rotating rectifier assembly 96 is shown in partial fragmentary cross-sectional side elevational view. The rotating rectifier assembly 96 includes the diode assembly 62 and the receptacle assembly 94. The diode assembly 62 has a housing 128 in which diodes 130 are stud mounted generally parallel to the central axis 92. The housing has an outside dimension 132 which is slightly less than an inside diameter 134 of the rotating shaft 60. A first end 136 of the housing 128 has an entry port 138 formed therein. The entry port 138 communicates with the transfer tube 106 to allow coolant to flow into the diode assembly 62 of the rotating rectifier assembly 96. The housing 128 defines a first passage 140 therein and extending therethrough. The first passage 140 communicates with the entry port 138 and allows the coolant to pass around the diodes 130.

The diodes 130 are mounted to conductive busses 142 having passages 144 passing therethrough to allow coolant to pass through the busses 142. Coolant passing through the passages 144 enters a second passage 146 which communicates with an exit port 148. The exit port 148 mates with transfer tube 149 which extends through the receptacle portion 94 and mateably communicates with the transport tube 108.

As discussed hereinabove, coolant travels through the transfer tube 106 into the rectifier assembly 96 through an entry port 138 into the first passage 140 and through the passages 144. After passing through the passages 144 and into a second passage 146, the coolant flows through the exit port 148 and into the transport port 108. Fluid returns through the helical passage 112 as shown in FIG. 3 and passes through the gap 116 defined between the inside surface 98 of the rotating shaft 60 and an outside surface 118 of the rotating rectifier assembly 96.

Figure 5:
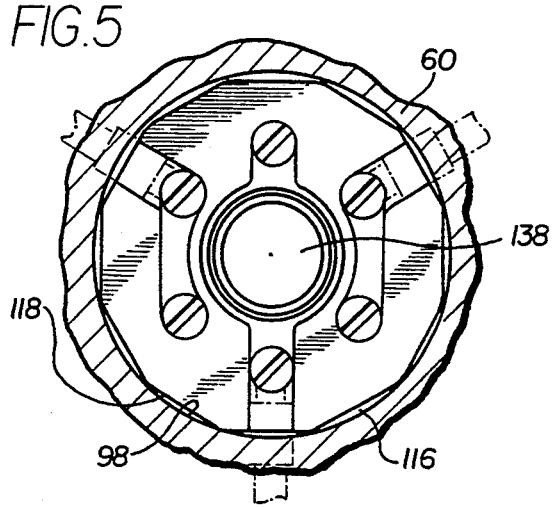
FIG. 5 is partial fragmentary cross sectional end view of the rotating rectifier assembly taken along line 5—5 in FIG. 4 in which the rotating rectifier assembly is installed in a rotating shaft.
Figure 6:
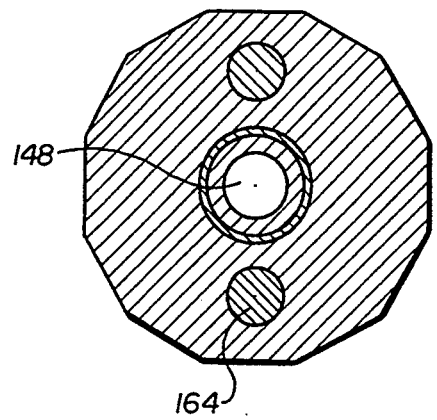
FIG. 6 is a cross-sectional view of the rotating rectifier assembly taken along line 6—6 in FIG. 4.

With reference to FIG. 5, it should be noted that the cross-sectional area of the entry port 138 is substantially equal to the summed cross-sectional area of the gaps 116. Additionally, with reference to FIG. 3, as the fluid flows through the center of the rotating rectifier assembly 96, the coolant has absorbed very little heat from the generator 70 and therefore may maximize the amount of heat transferred and removed from the rotating rectifier assembly 96. As the returning coolant passes through the gaps 116 over the outside of the rotating rectifier assembly 96, the coolant has not attained its maximum heat carrying capacity and therefore further reduces the temperature of the rotating rectifier assembly 96.

In further reference to the electrical structure and function of the rotating rectifier assembly 96, the diode portion 62 includes six diodes 130 in stud-mounted DO-4 cases which are used to full-wave rectify the three-phase AC output of the exciter armature 58 into the DC power required by the main field 54. If it becomes necessary to rectify a higher level of power, the DO-4 shown diodes may be replaced with DO-5 cased devices which are more current-capable, with a corresponding increase in dimensions. Alternatively, diode assemblies may be cascaded for greater power rating. The six diodes 130 are divided into two groups of three positively oriented devices 150 and three negatively oriented devices 152. The three positive diodes 150 are mounted on a positive DC bus 154 while the three negative oriented diodes 152 are mounted on a negative DC bus 156. (See FIG. 8).

Two of each of the three diodes in each group 150, 152 are retained on the respective busses 154, 156 with ordinary nut-type fasteners 158. The central diode 160, 162 of each group 150, 152 is retained on the respective bus 154, 156 by a conductive customized nut 164 which serves as a contact of the diode assembly 62 which engages a corresponding mating contact 166 of the receptacle portion 94. (See FIG. 7).

Figure 7:
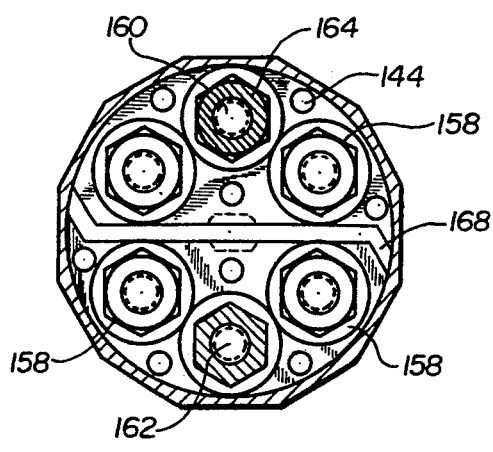
FIG. 7 is a cross-sectional view of the rotating rectifier assembly of the present invention taken along line 7—7 in FIG.4.
Figure 8:
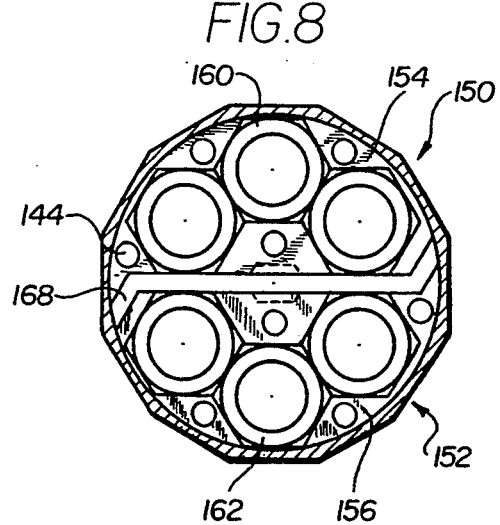
FIG. 8 is a cross-sectional view of the rotating rectifier assembly of the present invention taken along line 8—8 as shown in FIG. 4.

The respective busses 154, 156 are physically and electrically separated from each other by a key insulator 168 which may be machined or molded from suitable material such as polyetheretherketone (PEEK) or a polyimide such as commonly available under the tradenames of "TORLON" or "VESPEL". FIGS. 7 and 8 provide further illustration of the passages 144 passing through the respective busses 154, 156 as described in greater detail hereinabove.

The distribution of the passages 144 through the busses 154, 156 assures that the coolant will be generally evenly diffused around the diodes 130 of the assembly thereby providing efficient and even heat transport away from these components.

Figure 4:
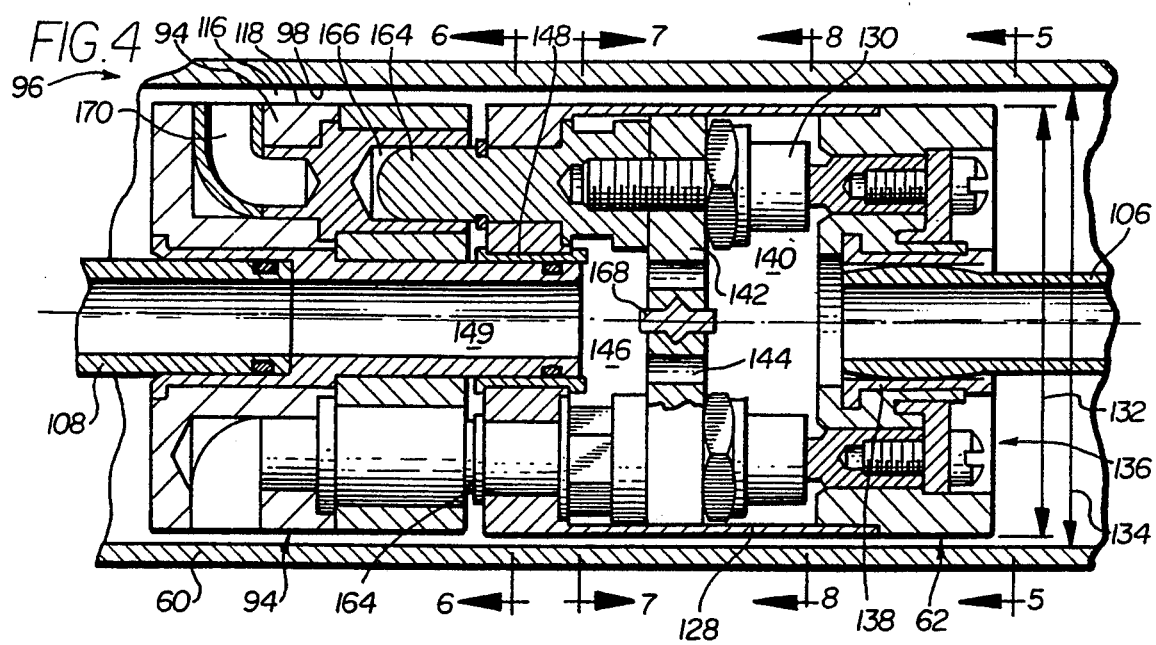
FIG. 4 is an enlarged partial fragmentary cross-sectional side elevational view of the rotating rectifier assembly of the present invention as shown in FIG. 3.

With further reference to FIG. 4, the receptacle portion 94 is mounted inside the shaft 60. The sockets or contacts 166 provide a conductive path from the diodes 130 to field leads 170 which are attached to the field by suitable means of attachment such as crimping, brazing, or soldering.

The rotating rectifier assembly 96 as shown in the Figures and described hereinabove minimizes the space utilized by the rectifier assembly 96 by positioning the assembly within the hollow shaft 60 thereby utilizing space which is otherwise unoccupied. Another purpose for positioning the rotating rectifier assembly 96 inside the shaft 60 is to reduce of the affect of the centrifugal forces on the diodes 130 of the diode assembly 62. In fact, the extremely close proximity of the diodes 130 relative to the central axis 92 makes the diodes 130 almost immune to the effects of the centrifugal forces produced when the shaft 60 is rotated at extremely high rpm.

The position of the rotating rectifier assembly 96 inside the shaft also provides highly efficient heat transport away from the rectifier assembly 96. The entire coolant flow through the generator 70 passes through the rotating rectifier assembly 96 and then over the outside of the rotating rectifier assembly 96 removing heat therefrom. The coolant flow passes through the rotating rectifier assembly 96 prior to accumulating heat from the generator 70 and therefore maximizes the heat removal therefrom and exposes the semiconductor devices to the coolest temperatures in the generator.

Additionally, the compact modular design of the receptacle portion 94 and the diode assembly 62 of the rotating rectifier assembly 96 allows for easy initial assembly and improved ease in repairing or replacing the diode assembly of the rotating rectifier assembly.

In use, a rotating rectifier assembly 96 in accordance with the description, claims and illustrations provided herein is positioned inside a rotating shaft 60 of a generator 70. The rotating rectifier assembly 96 is in communication with means for circulating coolant 100 in accordance with the details provided hereinabove. The rotating rectifier assembly 96 is installed in the rotating shaft 60 of the generator 70 by positioning a transport tube 108 and helical passage 112 inside the rotating shaft 60 and mounting a receptacle portion 94 of the rotating rectifier assembly 96 in communication therewith. Once the receptacle portion 94 is mounted inside the shaft 60, the diode assembly 62 is positioned inside the shaft 60 and engaged with the receptacle portion 94. Next, a transfer tube 106 is engaged with an entry port 138 of the rotating rectifier assembly 96. An anti-drive end cap 176 is attached so that a coolant entry conduit 102 formed therein communicates with the transfer tube 106.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. A rectifier assembly in combination with a brushless, self-excited, cooled, dynamo electric device, said dynamo electric device being of the type having a main dynamo unit with a rotating DC field producing structure associated with a hollow shaft, said unit being energized by an exciter dynamo unit having a rotor associated with said hollow shaft and producing AC, said shaft having a central axis extending longitudinally therethrough, and means for circulating coolant operatively associated with said dynamo electric device;

said rectifier assembly being disposed in said hollow shaft comprising:

a receptacle portion being retained inside said hollow shaft, said receptacle portion being electrically coupled to said dynamo electric device;

a diode assembly being disposed in said hollow shaft and matable with said receptacle portion for electrically coupling said diode assembly to said dynamo electric device for rectifying AC to DC to provide current to said DC field producing structure;

an entry port formed through one end of said diode assembly;

an exit port formed through an end of said receptacle portion distal said entry port;

a passage extending though said diode assembly and said receptacle portion, said passage communicating with said entry port and said exit port, said means for circulating coolant communicating with said entry port for providing coolant to said diode assembly and said receptacle portion;

at least two reduced dimension surfaces being defined on outside surfaces of said diode assembly and said receptacle portion having a dimension which is less than an inside surface of said hollow shaft, said reduced dimension surfaces being generally equidistantly spaced apart on said outside surfaces of said diode assembly and receptacle portion; and a gap being defined between each of said reduced dimension surfaces and said inside surface of said hollow shaft, said gap communicating with said exit port for transporting coolant from said passage over the outside of said receptacle portion and said diode assembly, each of said gaps defining substantially equal volumes for balancing fluid flow and weight distribution of fluid flowing therethrough.

2. A rectifier assembly as recited in claim 1, further comprising:
   positive and negative connectors attached to said diode assembly;
   a first end of said positive connector being coupled with a positive bus of said diode assembly:
   a second end of said positive connector defining a male plug component, said male component being electrically conductive;
   a positive female plug component on said receptacle portion for receiving said positive male component, said female component being electrically conductive and coupled with said dynamo electric device;
   a first end of said negative connector being coupled with a negative bus of said diode assembly;
   a second end of said negative connector defining a male plug component, said male component being electrically conductive; and
   a negative female plug component on said receptacle portion for receiving said negative male component, said female component being electrically conductive and coupled with said dynamo electric device.

3. A rectifier assembly for use with a dynamo electric device, said dynamo electric device being of the type having a rotor associated with a hollow shaft, said shaft having a central axis extending longitudinally therethrough, and means for circulating coolant operatively associated with said dynamo electric device, said rectifier assembly being disposed in said hollow shaft, said rectifier assembly comprising:
   a receptacle portion being retained inside said hollow shaft, said receptacle portion being electrically coupled to said dynamo electric device;
   a diode assembly being disposed in said hollow shaft and matable with said receptacle portion for electrically coupling said diode assembly to said dynamo electric device for rectifying AC to DC;
   an entry port formed through one end of said diode assembly;
   an exit port formed through an end of said receptacle portion distal said entry port;
   a passage extending though said diode assembly and said receptacle portion, said passage communicating with said entry port and said exit port, said means for circulating coolant communicating with said entry port for providing coolant to said diode assembly and said receptacle portion;
   at least two reduced dimension surfaces being defined on outside surfaces of said diode assembly and said receptacle portion having a dimension which is less than an inside surface of said hollow shaft, said reduced dimension surfaces being generally equidistantly spaced apart on said outside surfaces of said diode assembly and receptacle portion; and
   a gap being defined between each of said reduced dimension surfaces and said inside surface of said hollow shaft, said gap communicating with said exit port for transporting coolant from said passage over the outside of said receptacle portion and said diode assembly, each of said gaps defining substantially equal volumes for balancing fluid flow and weight distribution of fluid flowing therethrough.

4. A rectifier assembly as recited in claim 3, further comprising:
   positive and negative connectors attached to said diode assembly;
   a first end of said positive connector being coupled with a positive bus of said diode assembly:
   a second end of said positive connector defining a male plug component, said male component being electrically conductive;
   a positive female plug component on said receptacle portion for receiving said positive male component, said female component being electrically conductive and coupled with said dynamo electric device;
   a first end of said negative connector being coupled with a negative bus of said diode assembly;
   a second end of said negative connector defining a male plug component, said male component being electrically conductive; and
   a negative female plug component on said receptacle portion for receiving said negative male component, said female component being electrically conductive and coupled with said dynamo electric device.

* * * * *